United States Patent

[11] 3,633,333

[72] Inventors Alfred H. Schlemmer;
Melvin A. Pearson, both of Indianapolis, Ind.
[21] Appl. No. 8,333
[22] Filed Feb. 3, 1970
[45] Patented Jan. 11, 1972
[73] Assignee Ralph Hamill
Indianapolis, Ind.

[54] FEEDER AND JACKET APPLICATOR
14 Claims, 9 Drawing Figs.
[52] U.S. Cl. .................................................. 53/182,
53/373, 156/497
[51] Int. Cl. .................................................. B65b 9/02,
B65b 51/20
[50] Field of Search .......................................... 53/28, 180,
182, 373; 156/306, 497, 499

[56] References Cited
UNITED STATES PATENTS
3,212,229  10/1965  Vreeland et al. ............. 53/182
3,355,857  12/1967  Tobey ........................ 53/182
3,355,337  11/1967  Zelnick ...................... 156/499 X
3,488,244  1/1970   Lepisto ...................... 53/373 X
3,320,111  5/1967   Lucia et al. ................. 53/182 X
2,928,220  3/1960   Kannengiesser et al. ....... 53/373 X
3,443,356  5/1969   Hani ......................... 53/182 X Primary Examiner—Theron E. Condon
Assistant Examiner—Eugene F. Desmond
Attorney—Hood, Gust, Irish, Lundy & Coffey ABSTRACT: Apparatus for feeding and jacketing articles comprising means for serially feeding such articles to a pathway for movement therealong with predetermined spaces between adjacent articles, means for feeding a strip of plastic under such articles as they move along the pathway, means for feeding another strip of plastic over such articles as they move along the pathway and means for heat sealing and joining the plastic strips to provide a plastic film jacket for each such article. The side edges of the plastic strips are continuously heat-sealed together to provide a sleeve in which the articles are disposed and the plastic film strips are intermittently joined together within the spaces between the articles. The means which joins the plastic strips in the spaces between the articles also serves to separate the strips at those points. The side edges of the strips may be continuously sealed together by means of a hot wire or by means of heated air jets which serve to urge the strips together and to melt the strips.

INVENTORS
ALFRED H. SCHLEMMER
MELVIN A. PEARSON
BY
Hood, Gust, Irish & Lundy
ATTORNEYS

AIR SOURCE — 152
AIR HEATING MEANS — 154

INVENTORS
ALFRED H. SCHLEMMER
MELVIN A. PEARSON
BY
Hood, Gust, Irish & Lundy
ATTORNEYS INVENTORS
ALFRED H. SCHLEMMER
MELVIN A. PEARSON
BY
Wood, Gust, Irish & Lundy
ATTORNEYS INVENTORS
ALFRED H. SCHLEMMER
MELVIN A. PEARSON
BY
Hood, Gust, Irish & Lundy
ATTORNEYS

FEEDER AND JACKET APPLICATOR

It is an object of our invention to provide an apparatus for feeding and jacketing articles, such as record albums, at a higher frequency than has heretofore been accomplished. Our apparatus will feed articles, such as record albums, at a high speed along a pathway with predetermined spaces between adjacent articles. Our apparatus includes means for supporting two sources of plastic film strips, each having a width greater than the width of such articles, and means for continuously feeding such strips and articles to and along the pathway with film strip from one source being disposed above and in registry with such articles and film strip from the other source being disposed below and in registry with such articles and with the vertically registered side edges of such film strips extending respectively laterally beyond the side edges of such articles. We then provide first means for continuously heat-sealing and joining the vertically registered and moving side edges of the film strips to provide a moving plastic sleeve in which such articles are disposed, and second means for heating such plastic sleeve along transversely extending lines disposed in the spaces between such articles, the second means being arranged to melt the vertically registered film strips along zones adjacent such lines, thereby to divide such a sleeve into lengths with each such length containing an article, and the second means also being arranged to heat-seal and join the transversely extending edges of such lengths.

The said second means of our apparatus, i.e., the means for separating the sleeve into lengths with the transversely extending edges of each length sealed together, is analogous to the heat-sealing means disclosed in the Melvin A. Pearson U.S. Pat. No. 3,451,870 issued June 24, 1969. Our preferred second means for heat-sealing and separating the plastic sleeve into individual lengths includes an upper and lower seal roller disposed along the pathway through which the sleeve is moved to extend transversely, respectively, thereover and thereunder, and transmission means for drivingly connecting the seal rollers to provide corresponding movement thereof. We then provide a constant speed rotary driver and a relatively variable speed rotary driver and clutch means for alternately drivingly connecting the constant speed driver and the variable speed driver to the transmission means. An illustrative definition of our "constant speed rotary driver" and our "variable speed rotary driver" will be provided hereinafter. One of our seal rollers has an axially extending heating element carried on its periphery and axially extending compression elements disposed on opposite sides of the heating element and the other of our seal rollers has a pair of axially extending compression elements disposed on its periphery and spaced apart to engage, respectively, the first-mentioned compression elements during each revolution of the seal rollers whereby, as such a plastic sleeve moves between the seal rollers, the compression elements tightly hold the film strips forming the sleeve together on each side of such a melting zone while the heating element melts the zone. We provide means for operating the clutch means so that, during the period the compression elements are engaged, the seal rollers are driven by the constant speed driver at a tangential speed corresponding to the speed of movement of the articles and the film strips, and, during the period when the compression elements are not engaged, the seal rollers are driven by the variable speed driver at a speed which is selected to correspond to the size of such articles.

Our preferred means for serially feeding such articles along the pathway is also driven by the variable speed driver so that the articles can be selectively spaced apart relative to the plastic film strips which are fed at a relatively constant speed. Thus, with our preferred means for feeding the plastic film strips at a selected constant speed and our feeding means and seal rollers at a variable speed, we can adjust our apparatus to provide a predetermined amount of space between the articles and to provide for articles of a different size. Our apparatus is particularly suited for applying clear plastic film jackets to record albums of varying thickness.

As stated above, our apparatus includes means for continuously heat-sealing and joining the vertically registered and moving side edges of the film strip. This is an important feature of our invention because, heretofore, it has been difficult to heat-seal and join two plies of plastic film which are moving together at a high-speed past a heat-sealing station.

In one embodiment of our apparatus, we utilize first resilient roller means arranged to hold together the outer side edges of such film strips, second resilient roller means disposed axially inwardly from the first roller means and arranged to hold together portions of such film strips spaced inwardly from their outer edges, and a heated wire disposed between the first and second roller means and extending downwardly through the path of movement of such film strips. The heated wire is effective to heat and melt the portions of such film strips between the portions thereof held by the first and second roller means.

In another embodiment of our apparatus, the said first means for continuously sealing the side edges of the film strips includes means for heating air, first conduit means for connecting the heating means to a source of air under pressure, means for holding the vertically registered side edges of such film strips together, means for directing jets of such heated air at the side edges of such film strips so that the edges are tightly urged together and melted by the jets, and second conduit means for connecting the jet directing means to the heating means. In this embodiment, we use air which is heated to, for instance, approximately 1,000° F. and we direct one or more heated air jets at the film so that the force of the air in the jets urges the film strips tightly together and so that the heat in the air melts the film strips. As will be discussed in detail hereinafter, since we move the joined film strips at such a high speed, we prefer to provide on each side of the pathway along which the strips are moved, manifold means for directing a plurality of heated air jets vertically downwardly on the side edges of the film strips and an equal number of heated air jets vertically upwardly on the side edges of the film strips. Preferably, the manifold means is constructed so that the downwardly directing jets and the upwardly directed jets are, respectively, vertically registered so that the forces applied to urge the strips together are equalized.

It is another prime object of our invention to provide a method and apparatus for joining two plies of heat-sealable plastic film comprising means for bringing the two plies together and moving them together along a path and means for directing heated air at the two plies so that they are urged together and melted by the heat in such air. Note that we are utilizing heated air and not a flame of combustible material. It is known to use a flame as a source of heat energy for joining two or more plies of plastic film. However, to our knowledge, it is not known to utilize air which is heated to a high temperature and which is directed at two plies of plastic film in such a manner that the force of the air impinging on the plies will urge them together and so that the heat in the air will melt the plies so that they will be joined.

In this description and in the claims hereto, the term "air" includes any generally nonflammable or noncombustible gaseous fluid which can be compressed and then expanded through a heater to raise its temperature to, for instance, 1,000° F. without igniting or producing a flame. Our preferred apparatus utilizes air because it is rather conveniently obtained by means of a conventional air compressor and because most production facilities include air compressors.

In this description and in the claims appended hereto, the term "melt" is intended to define the condition of one or both of two plies of plastic film when softened or in a liquid state such that one ply can be joined to the other ply.

In this description and in the claims appended hereto, "heat-sealable plastic film" is intended to define those plastic films which will, by the application of heat, join together or "melt together." There are many such films presently on the market.

Other objects and features of our invention will become apparent as this description progresses.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 2 is a fragmentary, sectional plan view taken from FIG. 1 generally along the line 2—2;

FIG. 3 is an enlarged, fragmentary, perspective view of our preferred means for directing air jets at two plies of moving plastic film;

FIG. 4 is an enlarged fragmentary sectional view taken from FIG. 2 generally along the line 4—4;

Figure 1:
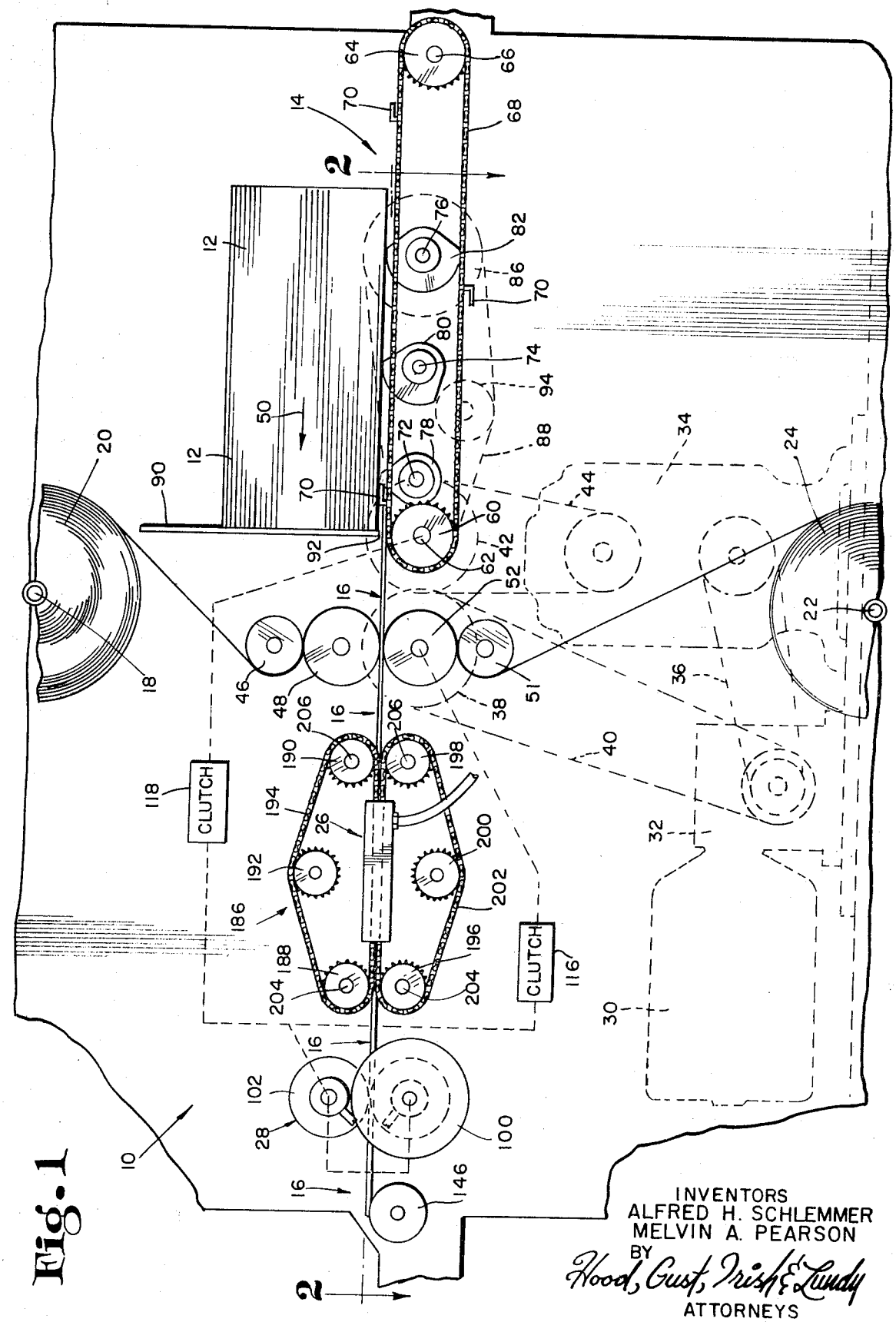
FIG. 1 is a fragmentary sectional and somewhat diagrammatical view showing our preferred apparatus for feeding and jacketing record albums.

Referring now particularly to FIGS. 1 and 2, it will be seen that our apparatus 10 is illustrated as being adapted for feeding and jacketing record albums 12, the apparatus comprising means 14 for serially feeding such albums 12 along a pathway 16 with predetermined spaces between adjacent albums, means, such as the arbor 18, for supporting a first source 20 of plastic film strip having a width greater than the width of such albums and means, such as the arbor 22, for supporting a second source 24 of plastic film strip having a width greater than the width of such albums. As will be more fully described hereinafter, our apparatus also includes means for continuously feeding such plastic film strips to and along the pathway 16 at a predetermined speed corresponding to the speed at which the albums 12 move with film strip from the first source 20 being disposed above and in registry with such albums and film strip from the second source 24 being disposed below and in registry with such albums and with the vertically registered side edges of such film strips extending respectively laterally beyond the side edges of the albums. Our apparatus 10 also includes first means 26 for continuously heat-sealing and joining the vertically registered and moving side edges of such film strips to provide a moving plastic sleeve in which the record albums 12 are disposed, and second means 28 for heating such plastic sleeve along transversely extending lines disposed in the spaces between such albums. This second means 28 is arranged to melt the vertically registered film strips providing such a sleeve along zones adjacent such lines, thereby to divide the sleeve into lengths with each such lengths containing an album 12. The means 28 is also arranged to heat seal and join the transversely extending edges of such lengths of sleeve.

The film strip which is applied to the upper surfaces of the albums 12 if fed from a rather large roll of plastic film indicated at 20. Similarly, the film strip which is applied to the bottom surfaces of the albums 12 is fed from a similar roll 24. The plastic film 20, 24 is preferably a clear plastic film of the type which can be heat-sealed or heat-joined and of the type which is referred to as heat-shrinkable. Specifically, the film strip from the upper roll 20 is joined to the film strip from the lower roll 24 by the first means 26 and the second means 28 to provide individual plastic jackets which enclose individual record albums 12. In another apparatus, such plastic jackets are shrunk tightly on the albums by heat.

The illustrative apparatus 10 is driven by an electrical motor 30 which drives a gearbox 32. Our preferred apparatus 10 includes a variable speed drive unit 34 which is drivingly connected to the gearbox 32 as indicated at 36. The variable speed unit 34 may be of any conventional commercial type of unit having an input and an output and means for varying the speed of the output relative to the speed of the input. Thus, since such units are conventional, the unit 34 will not be described in detail herein. The gearbox 32, which also is conventional, is drivingly connected directly to a sprocket 38 by means such as the chain indicated at 40. The output of the variable speed unit 34 is drivingly connected directly to another sprocket 42 by means such as the chain indicated at 44. Thus, for purposes of this description, those elements which are driven at a variable speed or through the variable speed unit 34 will be considered to be drivingly connected to the sprocket 42 while those elements driven at a constant speed, i.e., from the gearbox 32, will be considered to be driven from the sprocket 38. In this description and in the claims appended hereto, therefore, the sprocket 38 is an example of a constant speed rotary driver while the sprocket 42 is an example of a relatively variable speed rotary driver. The motor 30 may preferably be a variable speed motor so that the speed of the sprocket 38 can be selectively established. The speed of the sprocket 42 relative to the speed of the sprocket 38 is, of course, established by adjusting the variable speed unit 34.

We show film feed rollers 46, 48 disposed above the pathway 16 so that film fed from the source 20 is trained about the upper roller 46 and then about the lower roller 48 to be fed along the pathway 16 in the direction of the arrow 50. We show similar film feed rollers 51, 52 disposed below the pathway 16 and film from the source 24 trained about these rollers to be fed along the pathway 16 in the direction of the arrow 50.

The film feed rollers 48, 52 are drivingly connected together and to the sprocket 38 so that the speed at which the film is fed to and along the pathway 16 is determined by the speed at which the sprocket 38 is driven.

In FIG. 2, we show a plurality of gears 54 which are conventionally used drivingly to connect the various rotating elements of our apparatus 10 to the sprockets 38, 42. As a matter of simplification, we have not tried to show, in the drawings, details of the driving connections to the various rotating components. It will be appreciated that such details are merely conventional.

The illustrative feeder 14 in FIGS. 1 and 2 includes frame means 90 for holding a stack of record albums 12, the frame means being arranged, as indicated at 92, so that only the bottom album in the stack can move along the pathway 16. Generally speaking, the illustrative and preferred feeder 14 includes a pair of rotor means disposed under the frame means 90, endless means trained about the rotor means, the rotor means and endless means being arranged to provide an upper run of the endless means disposed just below the pathway 16, and pusher means carried by the endless means and arranged to extend upwardly a predetermined distance into the pathway 16 to engage and push the button album 12 of the stack therealong. In order to control the feeding of albums 12 into position to be moved by the pusher means, we provide a plurality of cams disposed under the frame means 90 and adjacent the upper run of the endless means, and means for driving the cams and the rotor means about which the endless means is trained so that movement of the pusher means corresponds to movement of the cams. Each of the cams is proportioned and arranged to extend upwardly to hold the albums 12 above the path of movement of the pusher means and the driving means for our apparatus 10 is arranged periodically to lower the cams to lower the bottom album of the stack into the path of movement of the pusher means.

With such a general description of our album feeder 14 in mind, we refer specifically to the illustrated feeder 14 (FIGS. 1 and 2) which includes a pair of forward sprockets 60 mounted on a shaft 62 for rotation therewith and a pair of rear sprockets 64 (only one sprocket 64 being shown in FIG. 1) mounted on a shaft 66 for rotation therewith. A pair of chains 68 are trained respectively about the two pairs of sprockets 60, 64, the sprockets constituting rotor means and the chains constituting endless means as discussed above. The shaft 62 is driven by the sprocket 42 at a speed determined by adjusting the variable speed unit 34. Each chain 68 carries, in the illustrative embodiment, three equally spaced pushers 70 which are proportioned and arranged, as they move across the upper run of the chain, to extend upwardly into the pathway 16 a predetermined distance. The chains 68 are synchronized so that the pushers 70 carried, respectively, by the chains move together about their respective paths. That is, a pusher 70 on one chain 68 will engage the bottom record album 12 in the stack at the same time that a pusher 70 on the other chain engages the album.

The illustrative feeder 14 includes three shafts 72, 74, 76 journal mounted in the apparatus 10 to be parallel with the shafts 62, 66, each of the three shafts 72, 74, 76 carrying a pair of cams 78, 80, 82. The cams 78, 80, 82 of each pair are identical and are mounted on their respective shafts so that their cam surfaces are displaced at the same angle relative to their shafts. Each pair of cams, therefore, may be considered the equivalent of one axially elongated cam. The cams 78, 80, 82 are driven to be in time with the movement of the pushers 70. In the illustrative embodiment, this is accomplished by placing a sprocket 84 on the shaft 62 for rotation therewith, a sprocket 86 on the shaft 76 for rotation therewith and drivingly connecting these sprockets by means of a chain 88. The two shafts 72, 74 may be drivingly connected to the shaft 76 by means of the gears 54 illustrated in FIG. 2 and discussed above.

Referring specifically to FIG. 1, it will be seen that the profiles of the cams 78, 80, 82 and the spacing of the shafts 72, 74, 76 on which the cams are mounted are such that the cams raise and lower the entire stack of record albums 12. The profiles of the cams 78, 80, 82 shown in FIG. 1 are our preferred cam profiles and are proportioned and constructed to correspond to the movement of the three pairs of pushers 70 about the sprockets 60, 64. Each cam 78, 80, 82 rotates through three revolutions during each complete trip of a pusher 70 about the path of the chain 68. Specifically, the three pairs of cams 78, 80, 82 operate to lower the stack of albums 12 so that each cooperating pair of pushers 70 will engage the lowest album 12 in the stack to push it in the direction of the arrow 50 along the pathway 16. The pair of cams 82 are constructed so that just as soon as a pair of pushers 70 have moved an album in the directed of the arrow 50 past the cams 82, the cams 82 will move upwardly to support the portion of the stack of albums 12 directly thereover. The pair of cams 80 and the pair of cams 78 operate in the same manner that the pair of cams 82 operate. That is, each pair of cams is proportioned and constructed so that its cam surface which is at a radius such that it will extend up into the pathway 16 will move downwardly to permit a pair of pushers 70 to push an album 12 therepast and then move upwardly to extend again into the pathway 16. The three pairs of cams 78, 80, 82 are, therefore, cam means for periodically lowering an album 12 into the path of a pair of pushers 70.

In FIG. 1, we show a conventional idler sprocket 94 keeping the proper tension on the chain 88 which drivingly connects the two shafts 62, 76.

Since the cams 78, 80, 82 and the chains 68, are driven through the variable speed unit 34, it will be apparent that the frequency at which the albums 12 are fed to and along the pathway 16 can be adjusted relative to the speed at which the sprocket 38 is driven. Thus, as will be more clearly explained hereinafter, since the film strips are fed to the pathway 16 by the rollers 48, 52 which are driven by the sprocket 38, the spacing between adjacent albums can be determined by adjusting the variable speed unit 34.

The two film feed rollers 48, 52 which extend transversely across the pathway 16 and between which the film from the source 20 and from the source 24 as well as the albums 12 are fed, serve to move the film and the albums sandwiched therebetween in the direction of the arrow 50 at the same speed. Thus, the feed rollers 48, 52 are properly considered to be a part of the means for feeding the albums 12 at the predetermined speed which corresponds to the speed at which the film is fed. This feature of our apparatus 10 is especially valuable because it permits us to compensate for the different thicknesses of record albums 12 simply by adjusting the unit 34.

Figure 5:
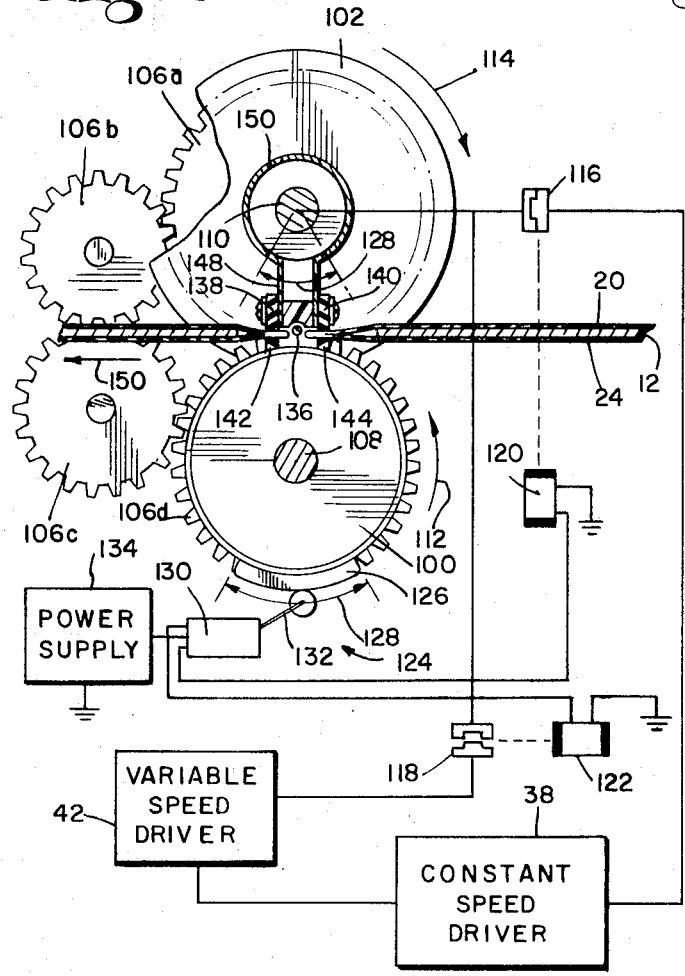
FIG. 5 is a diagrammatical view showing our preferred mechanism for driving the upper and lower seal rollers of our apparatus.

Referring now to FIGS. 1 and 5, our preferred second means 28 will be discussed. Our preferred second means 28 includes a lower seal roller 100 disposed below the pathway 16 to extend transversely thereacross and a cooperating upper seal roller 102 disposed above the pathway to extend transversely thereacross, the axes of these rollers being parallel, and transmission means for drivingly connecting the seal rollers to provide corresponding movement thereof. This transmission means, in the drawings, is represented by gears 106a, 106b, 106c, and 106d. The two gears 106b and 106c are used drivingly to connect the gears 106a and 106d so that the gears 106a and 106d and the shafts on which they are mounted can be vertically adjusted relative to each other to accommodate albums 12 of different thickness. The lower seal roller 100 is mounted on a shaft 108 for rotation therewith and the upper seal roller 102 is mounted on a shaft 110 for rotation therewith. The gear 106a is mounted on the shaft 110 for rotation therewith and the gear 106d is mounted on the shaft 108 for rotation therewith. The gears 106b and 106c serve drivingly to connect the other two gears 106a and 106d so that the seal rollers 100, 102 will be driven in the directions indicated, respectively, by the arrows 112, 114.

In the diagrammatical view of FIG. 5, we show a variable speed driver which corresponds to the sprocket 42 and a constant speed driver which corresponds to the sprocket 38. As discussed previously, the speed of the sprocket 38 corresponds directly to the speed of the motor 30 and to the speed at which the film is fed by the rollers 48, 52. It is for this reason that we refer to the sprocket 38 as a constant speed driver, recognizing that the motor 30 itself may have speed varying characteristics. The sprocket 42 is referred to as a variable speed driver because its speed can be varied relative to the speed at which the film is fed by the rollers 48, 52.

Our preferred apparatus 10 includes clutch means for alternately drivingly connecting the seal rollers 100, 102 to the constant speed driver 38 and the variable speed driver 42. In the illustrative embodiment, we show a clutch 116 arranged drivingly to connect the gear 106a and, therefore, the upper roller 102 to the constant speed driver 38 and another clutch 118 arranged drivingly to connect the gear 106a to the variable speed driver 42. The clutch 116 is operated by a solenoid 120 while the clutch 118 is operated by a solenoid 122, these two solenoids being controlled by a cam-operated switch means 124. The cam-operated switch means 124 includes a cam 126 which is connected to the lower seal roller 100 for rotation therewith, the cam 126 having a cam surface which is effective over a peripheral span represented by the angle 128. A two-position microswitch 130 is provided for alternately energizing the solenoids 120, 122, the switch having an actuator 132 which is arranged to be engaged and moved by the cam 126. The switch 130 is arranged alternately to connect the solenoids 120, 122 to a power supply such as indicated at 134. When the actuator 132 is riding on the radially projecting cam surface of the cam 126, the solenoid 120 is operated to operate the clutch 116 drivingly to connect the seal rollers 100, 102 to the constant speed driver 38. When the cam 126 has moved in the direction of the arrow 112 so that the actuator 132 can move radially inwardly relative to the lower seal roller 100, the solenoid 122 is operated to operate the clutch 118 drivingly to connect the seal rollers 100, 102 to the variable speed driver 42. Thus, each roller 100, 102 is driven about its axis through an angle equal to 360° minus the angle indicated at 128 at a speed selectively determined by adjusting the unit 34. Then, each roller 100, 102 is driven about its axis through the angle represented by the reference numeral 128 at a speed determined by the constant speed driver 38. The reasons for driving the seal rollers 100, 102 at these two speeds, one of which is variable with respect to the other, will become apparent as this description progresses.

Again, reference is made to the Melvin A. Pearson U.S. Pat. No. 3,451,870 which discloses and claims method and apparatus for heat sealing and joining two plies of plastic film which are brought together and moved continuously along a pathway. The seal rollers 100, 102 accomplish the same function as the seal rollers disclosed in this prior patent and our present invention is concerned primarily with the manner in which the seal rollers are driven via the clutches 116, 118 and the constant speed and relatively variable speed drivers.

In the illustrative embodiment, one of our seal rollers, for instance roller 102, has an axially extending hot wire-type heating element carried on its periphery and axially extending compression elements 138, 140 disposed on opposite sides of the heating element 136. The other of the seal rollers 100 has a pair of axially extending compression elements 142, 144 disposed on its periphery and spaced apart to engage, respectively, the first-mentioned compression elements 138, 140 during each revolution of the seal rollers. That is, the seal rollers 100, 102 are driven in synchronism such that the two compression elements 138, 142 engage each other for an instant and then the two compression elements 140, 144 engage each other for an instant. In FIG. 5, the rollers 100, 102 are shown in their positions such that the elements 138, 140 are, respectively, engaged to the elements 142, 144. Since the film strips from the sources 20, 24 are continuously fed between the seal rollers 100, 102, during each revolution of the seal rollers, the hot wire 136 melts a transversely extending zone of the two strips while the strips on each side of the zone are held tightly together by the compression elements 138, 140, 142, 144. Thus, by means of the seal rollers 100, 102 the two strips of film are divided into length with each length containing a record album 12.

Referring still to FIG. 5, it will be seen that, when the seal rollers 100, 102 move, respectively, in the directions of the arrows 112, 114 away from their illustrated position, the compression elements 138, 142 will disengage before the other two cooperating compression elements 140, 144 disengage. In order to take advantage of this difference in timing of disengagement of the compression elements to separate the length of film strips which have just been melted and sealed together by the hot wire 136, we provide friction drive roll means 146 which are driven at a higher speed than the speed at which the film is fed to the seal rollers 100, 102 so as to pull the severed lengths of plastic film in the direction of the arrow 50.

During the time when the compression elements 138-144 are engaged, the seal rollers 100, 102 are driven through the clutch 116 by the constant speed driver so that the tangential speed of the compression elements through the short arc is equal to the speed at which the film strips are moving. That is, from the time that the compression elements 138, 142 just begin to engage until the time that the compression elements 140, 144 begin to disengage, the switch 130 is operated by the cam 126 to operate the clutch 116 to keep the compression elements moving at the speed of the film. During the rest of the cycle of the seal rollers, while the compression elements re disengaged, the seal rollers move comparatively slower to compensate for the size of the albums 12 being jacketed. Of course, it is necessary that the movement of the seal rollers 100, 102 be timed so that the compression elements 138-144 are engaged to hold the film strips tightly therebetween in the spaces between adjacent record albums 12.

We refer to the rollers 100, 102 as being seal rollers even though it is not necessary that the rollers have a continuous peripheral surface. In fact, in some cases it may be advisable that the rollers do not have a continuous peripheral surface. In the illustration of FIG. 5, it will be seen that the compression elements 138, 140 and the wire 136 are supported by a radially extending arm 148 which is carried by a concentric drum 150 which is considerably smaller in diameter. The manner in which the current is fed to the hot wire 136 and in which the compression elements 138-144 and the wire are mounted does not need to be discussed, in detail, in this description.

The clutches 116, 118 and the solenoids 120, 122, and the switch 130 are all commercially available and well known. The manner in which these elements 116, 118, 120, 122, 130 are mounted on the apparatus 10 and of the manner in which they are connected to other components of the apparatus does not form part of our present invention.

Referring now particularly to FIGS. 1, 2, 3 and 4, our first means 26 for providing a continuous side edge seal of the film strips will be discussed.

We have discovered that two plies of heat-sealable plastic film can be joined together by directing heated air at the plies in such a manner that the plies are tightly urged together by the impingement of the air thereon and that the heat in the air melts the plies so that they are joined. It will be appreciated that this is a combination of pressure and heat used to weld plastic, the pressure being applied by the force of the moving air and the heat being applied by the heat in the air. It will be noted that we do not use a flame, such as produced by an acetylene torch, to joint the plastic plies. We simply heat compressed air to a high temperature, such as, for instance, between 700° F. and 1,400° F. and then direct one or more jets of this heated air at the two plies of plastic film. The seals that we obtain in this manner are significantly better from a strength standpoint and from an appearance standpoint than seals made with conventional techniques.

In the case of our apparatus 10, the side edges of the film strips are moving along the pathway 16 in the direction of the arrow 50 at high speed such as, for instance, 120–160 feet per minute. Thus, it has been necessary for us to construct the first means 26 in such a manner that a plurality of jets of heated air is directed at the side edges. Specifically, our means for heat sealing the moving side edges of the film strips 20, 24, i.e., the strips of film from the sources 20, 24, include an air source 152 which may be a conventional air compressor or a compressed air source of the type which is found around most factories and which is used to drive air-operated tools. In FIG. 4, we show the air source 152 diagrammatically because it does not form a part of our invention. In fact, our apparatus 10 is preferably provided with just a coupling which can be connected to any conventional air source. Our apparatus 10 preferably includes an air heating means such as indicated diagrammatically at 154 in FIGS. 2 and 4 and which can be connected to the air source 152 by first conduit means indicated at 156. We prefer to use an electrically heated air heating means 154 because of the ease with which electrical service is provided. Means for heating air to an extremely high temperature are commercially available and well known and need not be discussed, in detail, herein. For purposes of disclosure, however, it will suffice to say that we presently use an air heater made by Hotwatt Incorporated, 128 Maple Street, Danvers, Mass. By conventional regulation means, not shown, we supply air to the air heating means 154 at a pressure of, for instance, between 8 to 20 p.s.i. The air leaving the air heating means 154 is delivered to a manifold means 158 disposed on each side of the pathway 16 as shown in FIG. 2, one manifold means being shown in perspective in FIG. 3 and in section in FIG. 4.

The illustrative manifold means 158 provides a downwardly facing manifold portion 160 extending longitudinally along the pathway 16 and above the vertically registered side edges of the film strips and an upwardly facing manifold portion 162 extending longitudinally along the pathway and below such side edges as well as below the downwardly facing portion 160. The manifold portions 160, 162 are provided with perforations 164, 166 which provide a plurality of downwardly directed an upwardly directed jets of heated air spaced along the pathway 16 and through which such side edges of the film strips must move. For our particular application, each manifold portion 160, 162 provides eight perforations 164, 166 of 0.050-inch diameter with one-half inch spacing between adjacent perforations. The perforations 164, 166 are serially arranged longitudinally along the pathway 16 to provide a plurality of serially arranged vertically downwardly directed jets of heated air and an equal number of serially arranged vertically upwardly directed jets of heated air, each downwardly directed jet being colinear with one of said upwardly directed jets. Thus, in the illustrative embodiment, each manifold 158 provides eight serially arranged downwardly directed jets and eight serially arranged upwardly directed jets with all of the jets lying generally in the same vertical plane which extends longitudinally along the pathway 16. Thus, for reasons which will become apparent, since the air is supplied to the perforations 164 and the perforations 166 at the same pressure, the forces applied to the film by the downwardly directed jets are balanced out by the forces applied by the upwardly directed jets. As will be seen in FIG. 4, these forces will urge the two vertically registered side edges of the film strips 20, 24, together. Then, the heat in the air will serve to melt and join the edges which are so urged together.

Manifolds which will provide downwardly directed jets of heated air and an equal number of upwardly directed jets of heated air can be constructed in several different ways. We have constructed our illustrative manifolds 158 by hollowing out three elongated metal members and then attaching them rigidly together by means of screws 168 as shown in FIG. 4. In order to make sure that the air pressure within the hollow of the upper manifold portion 160 is equal to the air pressure in the hollow of the lower manifold portion 162, we provide an equalizing passageway 170. The heated air is then delivered to the manifold 158 through, for instance, the input ports indicated at 172. In FIG. 4 and in FIG. 2, we show a second conduit means 174 for connecting each manifold 158 to the air heating means 154. Although it is not shown, we prefer to provide electrically operated valve means arranged to dump the heated air leaving the means 54 into a waste conduit if, for any reason, our apparatus 10 is stopped. This prevents excessive heating of the apparatus adjacent the manifolds 158.

The manifold 158 provides a longitudinally extending wall portion 176 extending between the manifold portions 160, 162 and disposed to be laterally outwardly from the side edges of the film strips to direct heated air inwardly toward such side edges. In addition, in the illustrative embodiment, we show longitudinally extending shields 178, 180 extending downwardly and upwardly, respectively, from the manifold portions 160, 162 to keep the heated air adjacent the side edges of the film strips. These shields 178, 180 may be fabricated from a material commonly known as Teflon and they may be mounted on the manifold portions 160, 162 as illustrated so as to be slightly vertically adjustable. We prefer that the shields 178, 180 do not touch the film strips.

The distance between the perforations 164, 166, or the downwardly and upwardly facing surfaces of the manifold portions 160, 162 is approximately one-half inch.

The number of perforations, i.e., the length of the manifolds 158, the temperature of the air, and the pressure at which the air is applied to the air heating means 154 depends, to a great extent, on the speed at which the film strips are moved past the manifolds 158. We use the eight downwardly directed and eight upwardly directed jets spaced one-half inch apart, a temperature of approximately 700° F. to 1,400° F. and a pressure of 8–20 p.s.i. because we move the film strips past the manifolds 158 at speeds of 120–160 feet per minute. We have found that, for a plastic film which is from 0.0006 inch to 0.0001 inch thick and which is moved at this speed range, the side edge seals continuously obtained are very good from a strength standpoint and from an appearance standpoint. The film which we believe looks best on record jackets and which is used in our apparatus 10 and fed at the speeds above indicated past the manifolds 158 is a polyolefin-type film manufactured and sold by Dupont under the trademark "Clysar." Our apparatus is not, however, limited to any particular brand of heat-sealable plastic film. Such films, for instance, may commonly be polyolefin, polyethylene, or polypropylene film.

In the illustrative embodiment, each side-edge-sealing means 26 (FIGS. 1, 2 and 4) includes means, indicated generally at 186, for mechanically holding the side edges of the film strips together. Each illustrative means 186 includes (FIG. 1) above the film strips a rotor 188 disposed downstream from the means 26 and just above the pathway 16, a rotor 190 disposed upstream from the means 26 and just above the pathway 16, an idler rotor 192 and a chain 194 trained about these rotors to provide a lower run thereof which is disposed as best seen in FIG. 4. Each means 186 also includes, below the pathway, similar rotors 196, 198, 200 and a chain 202 trained thereabout to provide an upper run which is disposed just below the lower run of its corresponding chain 194. The rotors 188, 190, 192, 196, 198, 200 may be conventional sprockets or they may be rollers provided with peripherally extending grooves which guide the chains trained thereabout. These rotors and the chains 194, 202 are positioned and arranged so that the lower run of the chain 194 and the upper run of the chain 202 extend for a considerable distance along the pathway 16 with the spacing between these runs being such that the side edges of the film caught therebetween will be mechanically held together as clearly illustrated in FIG. 4.

Referring to FIGS. 1 and 2, it will be seen that the rotors 188, 196 are mounted on a pair of vertically spaced-apart shafts 204 while the rotors 190, 198 are similarly mounted on a pair of vertically spaced-apart shafts 206. These shafts 204, 206 are drivingly connected to the constant speed sprocket 38 by means such as the illustrated gears 54 (FIG. 4) so that the chains 194, 202 are driven at a speed corresponding to the speed at which the film is fed between the two chains. That is, the speed of movement of the chain 194 along its lower run and the speed of movement of the chain 202 along its upper run is equal to the speed of movement of the film strips therebetween. Resilient rollers 208, 210 are preferably mounted on each shaft 204, 206 to engage the film strips moving therebetween to roll the film strips firmly against the albums disposed therebetween to remove air pockets which may be caught between the film strips and albums.

Our apparatus 10 described thus far is a highly satisfactory apparatus for applying plastic film jackets to articles such as record albums. Our apparatus 10 is extremely versatile because of the manner in which its various parts are driven through the described constant speed driver and relatively variable speed driver. Because of the variable speed feature, we can vary the frequency at which we feed articles to the pathway, thereby to vary the spacing between adjacent articles along the pathway and relative to the film being fed along the pathway. Our hot air side-edge-sealing means permits us to feed two strips to a pathway and to move them along the pathway at a high rate of speed, sealing the side edges of the strips together to provide a fast-moving plastic sleeve which contains the articles.

Figure 6:
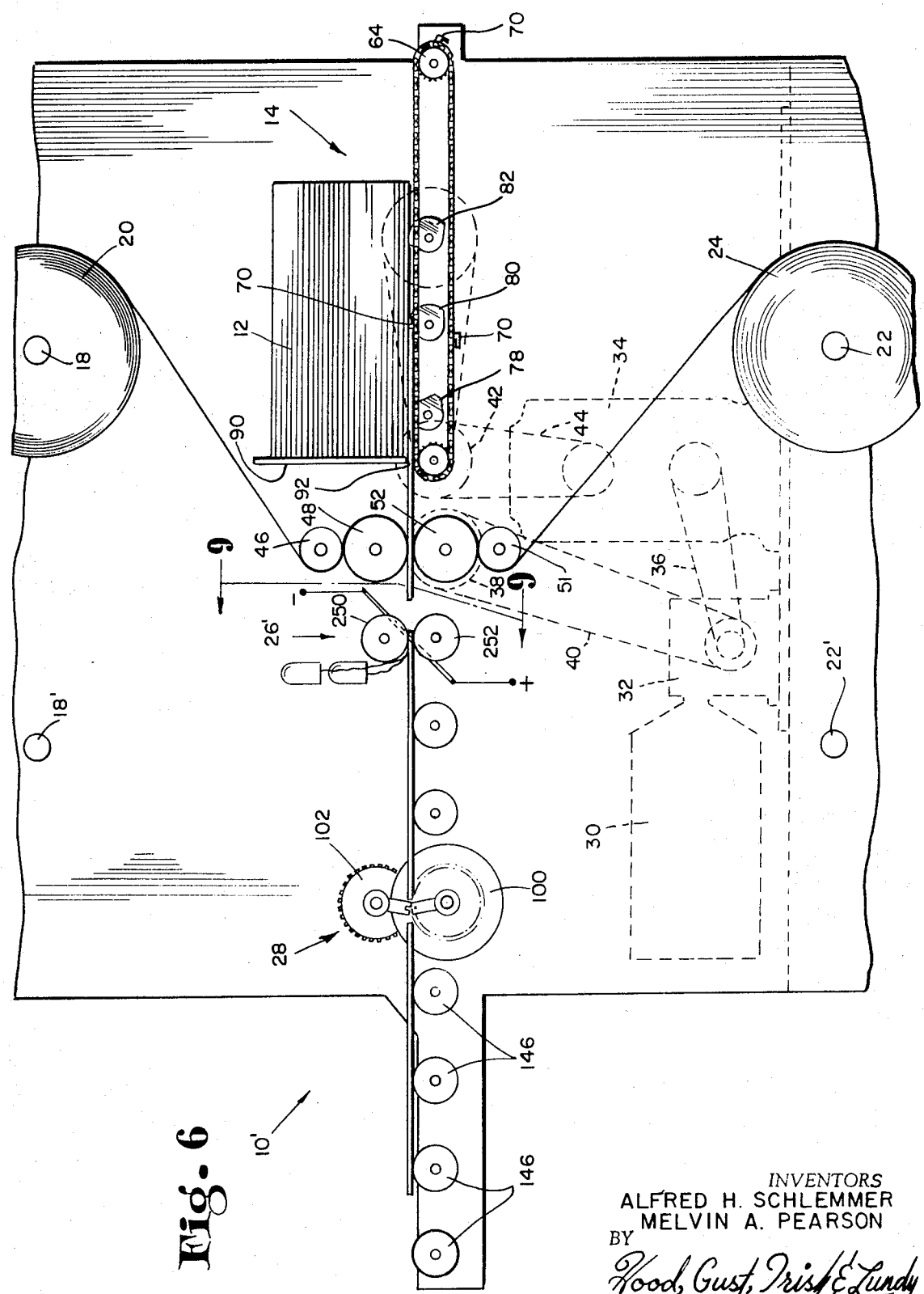
FIG. 6 is a fragmentary sectional view showing, in elevation and somewhat diagrammatical, another apparatus constructed in accordance with our present invention, this apparatus using electrically heated hot wires to provide the continuous side edge seals.
Figure 7:
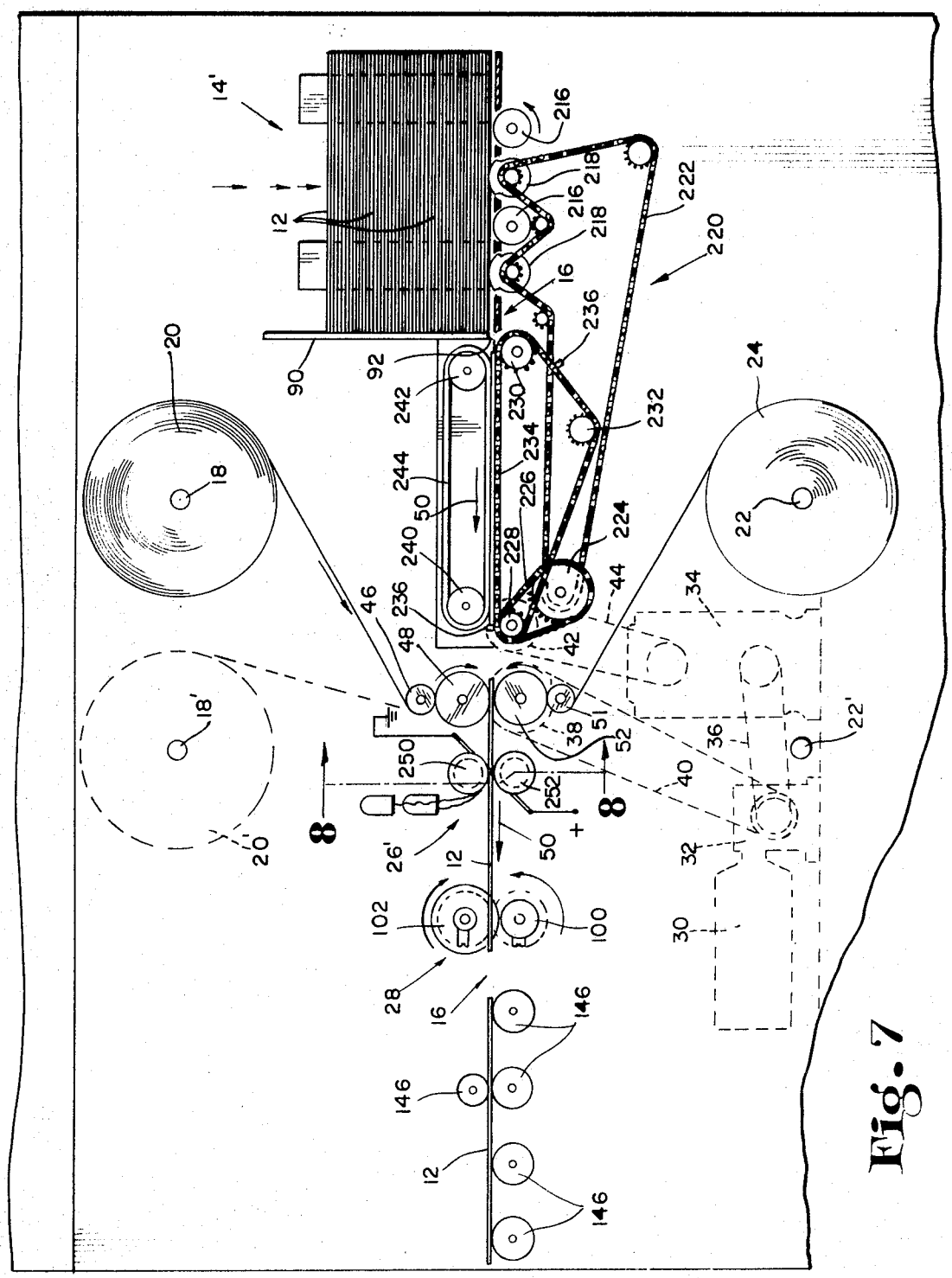
FIG. 7 is another fragmentary, somewhat diagrammatical and sectional view showing still another apparatus constructed in accordance with our present invention, this apparatus including friction drive roller means for feeding record albums.

We turn now to two slightly different embodiments 10′, 10″, of our apparatus shown, respectively, in FIGS. 6, 7. In the description of these embodiments, like reference numerals represent like parts. Only those features which differ significantly from the features of the apparatus 10 discussed above will be described.

Referring to FIG. 6, it will be appreciated that, primarily, the difference between the apparatus 10′ and the apparatus 10 (FIG. 1) is the fact that the side-edge-sealing means 26′ shown therein utilize electrically heated wires.

Referring to FIG. 7, it will be seen that the apparatus 10″ disclosed therein is substantially the same as the apparatus 10′ except that it includes a different type of article feeder 14′. The apparatus 10″ does utilize the electrically heated hot wire side edge sealers 26′ used in the apparatus 10′ of FIG. 6.

The article feeder 14' (FIG. 7) includes frame means 90 for holding a stack of articles, such as the record albums 12, the frame means being arranged, as indicated at 92 so that only the bottom album 12 in the stack can move along the pathway 16. The feeder 14' further includes friction drive roller means disposed under the frame means 90 and arranged to engage and drive the bottom album 12 of the stack along the pathway 16 in the direction of the arrows 50. Cam means 218 are disposed under the frame means 90 and arranged to engage and lift the stack of albums 12 so that the bottom album thereof is not in contact with the friction drive roller means 216. Means 220 is provided for driving the cam means 218 periodically to lower the stack and the bottom album thereof into contact with the friction drive roller means 216. Thus, each time the cam means 218 permits the stack to drop downwardly, one record album is driven in the direction of the arrow 50 by the friction drive roller means 216. The driving means 220 includes a chain 222 which drivingly connects the cam means 218 to a sprocket 224 which is, in turn, connected by a chain 226 to a sprocket 228 mounted for rotation with the previously discussed variable speed driver 42, i.e., the sprocket which is driven by the variable speed unit 34. Thus, the frequency at which the cams 218 are rotated periodically to lower the stack of albums 12 into engagement with the friction drive roller means 216 is selectively determined. The friction means 216 may be, for instance, driven at a desired speed by means such as the previously discussed gears 54 which are driven from the sprocket 38 which is connected to the gearbox 32 by means of the chain 40.

The feeder 14' also includes spaced-apart rotor means and endless means trained thereabout and arranged to provide a run of the endless means adjacent the pathway 16 and between the frame means 90 and the point at which the film strips 20, 24 are fed to the pathway, i.e., at the point of the film feed rollers 48, 52. Stop means are carried by this endless means and arranged to extend into the pathway. Means are provided for drivingly connecting these rotor means and endless means to the same driving means to which the cam means 218 are connected so that the movement of the stop means on the endless means corresponds to the periodic movement of the cam means 218, the stop means being effective accurately to space the record albums relative to the film strips 20, 24. In the illustrative embodiment of FIG. 7, the spaced apart rotors are sprockets 228, 230 and idler sprocket 232 and the endless means is the illustrated chain 234. The stop means carried by the chain 234 are indicated at 236. The upper run of the chain 234 is disposed adjacent the pathway 16 to extend therealong.

Just above the upper run of the chain 234 is a pair of rotors 240, 242 about which a belt 244 is trained so that its lower run is disposed just above and along the pathway 16. The rotors 240, 242 are driven at the same speed at which the chain 234 is driven and the lower run of the belt 244 serves to hold the record albums downwardly on the upper run of the chain 234.

Referring now to FIGS. 6, 7, 8 and 9, the illustrative side-edge-sealing means 26' will be discussed.

Figure 8:
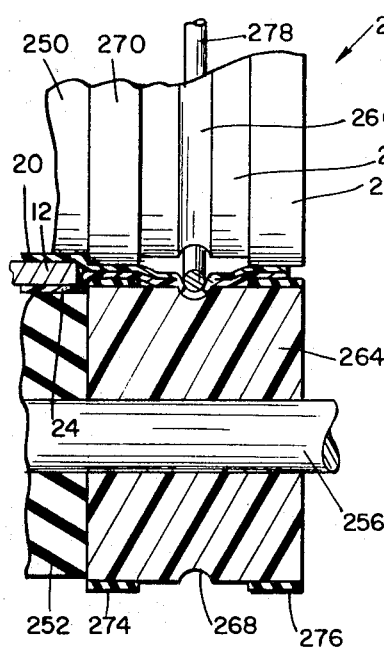
FIG. 8 is an enlarged fragmentary sectional view taken from FIG. 7 generally along the line 8—8.
Figure 9:
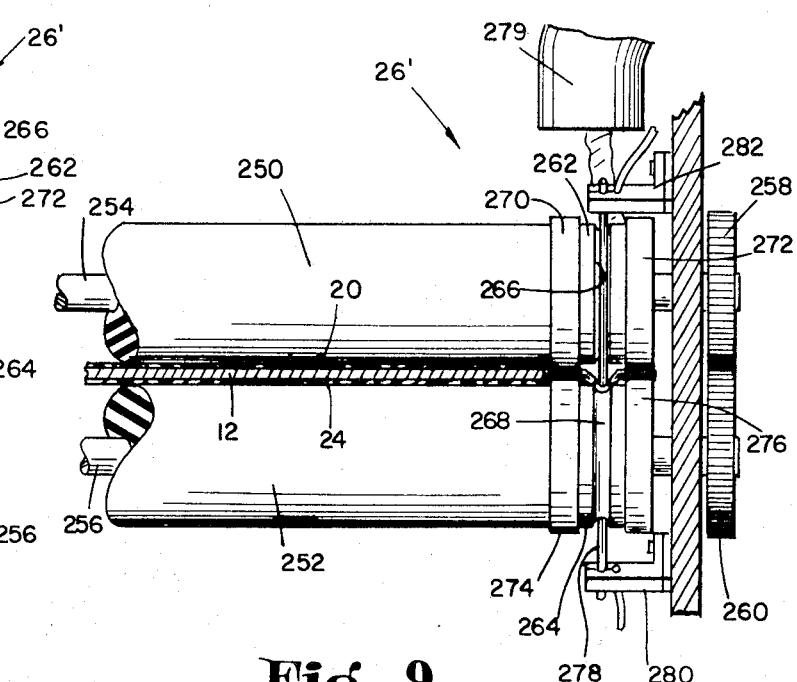
FIG. 9 is an enlarged fragmentary sectional view taken from FIG. 6 generally along the line 9—9.

Each of the apparatus 10', 10'' includes an upper roller 250 and a lower roller 252 extending transversely across, above and below, respectively, the pathway 16. These rollers 250, 252 are preferably relatively soft rollers provided for squeezing the air out from between the film strips 20, 24. The rollers 250, 252 are, respectively, mounted on transversely extending shafts 254, 256 for rotation therewith, these shafts being drivingly connected by means of gears 258, 260 as shown in FIG. 9. One of the two gears 258, 260 is drivingly connected, for instance by means of the previously discussed gears 254, to the constant speed sprocket 38. Thus, the rollers 250, 252 are driven at a speed corresponding to the speed at which the film is fed. The side-edge-sealing means 26' are disposed to be at the ends of the rollers 250, 252. FIGS. 8 and 9 show one such sealing means 26'. Referring to FIGS. 8 and 9, it will be seen that a plastic roller 262, 264 is mounted on the end of each shaft 254, 256 for rotation therewith. These plastic rollers 262, 264 are preferably made from a material which is generally rigid and generally heat resistant, such a material being known as Teflon. Each of these plastic rollers 262, 264 is provided with a continuous groove 266, 268 about is periphery, the grooves being vertically aligned as clearly indicated in FIGS. 8 and 9.

A resilient band 270, 272 is disposed peripherally about the roller 262 on each side of the groove 266 and, similarly, a resilient band 274, 276 is disposed peripherally about the roller 264 on each side of its groove 268. These bands 270, 272, 274, 276 may be constructed from, for instance, silicon rubber or other similar material. These resilient bands or resilient roller bands 270, 272, 274, 276 serve as resilient roller portions arranged to grip therebetween the side edge portions of the film strips 20, 24. Specifically, the two roller portions 272, 276 are first resilient roller portions arranged to grip therebetween the outer side edges of the film strips 20, 24 and the roller portions 270, 274 are second resilient roller portions disposed axially inwardly from the first roller portions and arranged to grip therebetween portions of the film strips spaced inwardly from their outer edges. Between these resilient roller portions 270–276, we provide an electrically heated wire 278 which extends downwardly at an angle of 45° between the rollers 262, 264 and through the path of movement of the side edge portions of the film strips. The axes of the rollers 262, 264 lie in a vertically extending plane and the wire 278 lies in a vertically extending plane which is perpendicular to the axes of the rollers 262, 264 and which axially bisects the grooves 266, 268 formed in these rollers. Preferably, the wire 278 extends through the vertically extending plane including the axes of the rollers 262, 264 at the same point where the film strips 20, 24 move through this plane. Thus, the groove 266 in the upper roller 262 provides clearance for the wire 278 and the groove 268 in the lower roller 264 likewise provides clearance for the wire. In the embodiments which we have thus far constructed, we have formed the grooves 266, 268 to have a 0.090-inch radius and we have used wires 278 with a 0.052-inch diameter.

The heating wire 278 of each side-edge-sealing means 26' is arranged to heat and melt the portions of the film strips between the portions thereof gripped by the resilient roller portions 270, 272, 274, 276. Since the film strips are moved together continuously past the wires 278 of each sealing means 26', the portions of the strips engaged by the resilient roller portions 272, 276 are cut off from these strips by the wires. Thus, we place conduits 279 adjacent each said-edge-sealing means 26' to remove such cut off portions, these conduits 279 being connected to a vacuum source.

Each wire 278 is supported at its end by mounts 280, 282 (FIG. 9) and the wires are conventionally connected to a source of electrical energy.

The side-edge-sealing means 26' discussed above work quite satisfactorily. The means 26' discussed above has been used by us successfully to join the side edge portions of two plies of plastic film moving at a relatively fast speed. Thus, our apparatus 10, 10', 10'' can be provided with the hot air side-edge-sealing means 26 or the electrically heated side-edge-sealing means 26'.

We claim:

1. Apparatus for feeding and jacketing articles comprising means for serially feeding such articles to a pathway for movement therealong with predetermined spaces between adjacent articles, means for supporting a first source of plastic film strip having a width greater than the width of such articles, means for supporting a second source of plastic film strip having a width greater than the width of such articles, means for continuously feeding such plastic film strips and such articles to and along said pathway at a predetermined speed with film strip from such first source being disposed above in registry with such articles and film strip from such second source being disposed below and in registry with such articles and with the vertically registered side edges of such film strips extending respectively laterally beyond the side edges of such articles, first means for continuously heat sealing and joining the vertically registered and moving side edges of such film strips to provide a moving plastic sleeve in which such articles are disposed, and second means for heating such strips along transversely extending lines disposed in the spaces between such articles, said second means being arranged to melt the vertically registered film strips along zones adjacent such lines thereby to divide such strips into lengths with each such length containing an article, and said second means being arranged to heat seal and join the transversely extending edges of such lengths, said article-feeding means including frame means for holding a stack of such articles, said frame means being arranged to that only the bottom article in the stack can move along said pathway, drive roller means disposed under said frame means and arranged to engage and drive the bottom article of the stack along said pathway, cam means disposed under said frame means and arranged to engage and lift the stack so that the bottom article therein is not in contact with said drive roller means, and means for driving said cam means periodically to lower the stack and the bottom article thereof into contact with said drive roller means.

2. Apparatus for feeding and jacketing articles comprising means for serially feeding such articles to a pathway for movement therealong with predetermined spaces between adjacent articles, means for supporting a first source of plastic film strip having a width greater than the width of such articles, means for supporting a second source of plastic film strip having a width greater than the width of such articles, means for continuously feeding such plastic film strips and such articles to and along said pathway at a predetermined speed with film strip from such first source being disposed above and in registry with such articles and film strip from such second source being disposed below and in registry with such articles and with the vertically registered side edges of such film strips extending respectively laterally beyond the side edges of such articles, first means for continuously heat sealing and joining the vertically registered and moving side edges of such film strips to provide a moving plastic sleeve in which such articles are disposed and second means for heating such strips along transversely extending lines disposed in the spaces between such articles, said second means being arranged to melt the vertically registered film strips along zones adjacent such lines thereby to divide such strips into lengths with each such length containing an article, and said second means being arranged to heat seal and join the transversely extending edges of such lengths, said article-feeding means including frame means for holding a stack of such articles, said frame means being arranged so that only the bottom article in the stack can move along said pathway, a pair of rotor means disposed under said frame means, endless means trained about said rotor means, said rotor means and said endless means being arranged to provide an upper run of said endless means disposed just below said pathway, pusher means carried by said endless means and arranged to extend upwardly a predetermined distance into said pathway to engage and push the bottom article to the stack therealong, a plurality of cam disposed under said frame means and adjacent said upper run, means for driving said cams and said rotor means so that movement of said pusher means corresponds to movement of said cams, each of said cams being proportioned and arranged to extend upwardly to hold such articles above the path of movement of said pusher means, and said driving means being arranged periodically to lower said cams to lower the bottom article of the stack into the path of movement of said pusher means.

3. The apparatus of claim 2 in which said driving means is arranged to drive said means for feeding such film strips and in which said driving means includes means for selectively varying the speed at which said pusher means is driven relative to the speed at which such film strips are fed, thereby to determine the amount of film strip between adjacent articles.

4. The apparatus of claim 2 in which said rotor means include at least one pair of sprockets and said endless means includes at lest one chain trained about said sprockets, in which said cams are mounted for rotation about axes generally parallel to the axes of rotation of said sprockets, and in which said cams are drivingly connected to said sprockets.

5. The apparatus of claim 4 in which said plurality of cams includes three cams spaced along said pathway and adjacent said upper run, each of said cams having a perimetral portion which extends upwardly a distance substantially equal to said predetermined distance, and in which said pusher means includes three pusher elements spaced about said endless means.

6. The apparatus of claim 1 in which said driving means is arranged to drive said means for feeding such film strips and in which said driving means includes means for selectively varying the speed at which said cam means is driven relative to the speed at which such film strips are fed, thereby to determine the amount of film strip between adjacent articles.

7. The apparatus of claim 6 including spaced apart rotor means and endless means trained thereabout and arranged to provide a run of said endless means adjacent said pathway and between said frame means and the point at which such film strips are fed to said pathway, stop means carried by said endless means and arranged to extend into said pathway, means for drivingly connecting said rotor means and endless means to said driving means so that the movement of said stop means corresponds to the periodic movement of said cam means, said stop means being effective accurately to space such articles relative to such film strips.

8. Apparatus for feeding and jacketing articles comprising means for serially feeding such articles to a pathway for movement therealong with predetermined spaces between adjacent articles, means for supporting a first source of plastic film strip having a width greater than the width of such articles, means for supporting a second source of plastic film strip having a width greater than the width of such articles, means for continuously feeding such plastic film strips and such articles to and along said pathway at a predetermined speed with film strip from such first source being disposed above and in registry with such articles and film strip from such second source being disposed below and in registry with such articles and with the vertically registered side edges of such film strips extending respectively laterally beyond he side edges of such articles, first means for continuously heat sealing and joining the vertically registered and moving side edges of such film strips to provide a moving plastic sleeve in which such articles are disposed, and second means for heating such strips along transversely extending lines disposed in the spaces between such articles, said second means being arranged to melt the vertically registered film strips along zones adjacent such lines thereby to divide such strips into lengths with each such length containing an article, and said second means being arranged to heat seal and join the transversely extending edges of such lengths, said first means including, on each side of said pathway, an upper roller and a lower roller providing, respectively, first resilient roller portions arranged to grip therebetween the outer side edges of such film strips and second resilient roller portions disposed axially inwardly from said first roller portions and arranged to grip therebetween portions of such film strips spaced inwardly from their outer edges, and a heating element disposed between said first and second resilient roller portions and extending through the path of movement of such film strips, said element being arranged to heat and melt the portions of such film strips between the portions thereof gripped by said first and second resilient roller portions, the axes of said upper and lower rollers lying in a common vertically extending plane perpendicular to the direction of movement of such film strips past said rollers, and said heating element being a generally straight wirelike element extending downwardly and in the direction of movement of such film strips to intersect said plane at the point at which such film strips intersect said pane, said element extending downwardly at an angle of approximately 45° relative to said plane, said upper and lower rollers being respectively provided with peripherally extending grooves disposed between their respective resilient roller portions, said element lying in a second vertically extending plane which is perpendicular to said first mentioned plane and which axially bisects said grooves whereby, said element extends through a portion of the groove in said upper roller and a portion of the groove in said lower roller.

9. Apparatus for feeding and jacketing articles comprising means for serially feeding such articles to a pathway for movement therealong with predetermined spaces between adjacent articles, means for supporting a first source of plastic film strip having a width greater than the width of such articles, means for supporting a second source of plastic film strip having a width greater than the width of such articles, means for continuously feeding such plastic film strips and such articles to and along said pathway at a predetermined speed with film strip from such first source being disposed above and in registry with such articles and film strip from such second source being disposed below and in registry with such articles and with the vertically registered side edges of such film strips extending respectively laterally beyond the side edges of such articles, first means for continuously heat-sealing and joining the vertically registered and moving side edges of such film strips to provide a moving plastic sleeve in which such articles are disposed, and second means for heating such strips along transversely extending lines disposed in the spaces between such articles, said second means being arranged to melt the vertically registered film strips along zones adjacent such lines thereby to divide such strips into lengths with each such length containing an article, and said second means being arranged to heat seal and join the transversely extending edges of such lengths, said first means including means for heating air, first conduit means for connecting said heating means to a source of air under pressure, means for holding the vertically registered and moving side edges of such film strips together, means for directing heated air upwardly at such side edges and downwardly at such side edges so that the edges are tightly urged together and melted by such air, and second conduit means for connecting said directing means to said heating means, said directing means including, at each side of said pathway, manifold means providing a downwardly facing manifold portion extending along said pathway and above such vertically registered side edges and an upwardly facing manifold portion extending along said pathway and below such side edges and said downwardly facing portion, said manifold portions being perforated to provide a plurality of downwardly directed and upwardly directed jets of heated air spaced along said pathway and through which such side edges must move, such air being supplied to said manifold means at a pressure between 8 to 20 p.s.i., said heating means heating such air to a temperature between 700° F. and 1,400° F., there being eight of said perforations of 0.050-inch diameter provided in said manifold portions with one-half inch spacing between adjacent perforations, said downwardly facing portions and said upwardly facing portions being spaced approximately one-half inch apart, each of said manifold means providing a longitudinally extending wall portion extending between said manifold portions and disposed laterally outwardly from such side edges to direct such heated air inwardly toward such side edges and longitudinally extending shields extending downwardly and upwardly, respectively, from said downwardly and upwardly facing manifold portions to keep such heated air adjacent such side edges.

10. Apparatus for feeding and jacketing articles comprising means for serially feeding such articles to a pathway for movement therealong with predetermined spaces between adjacent articles, means for supporting a first source of plastic film strip having a width greater than the width of such plastic articles, means for supporting a second source of plastic film strip having a width greater than the width of such articles, means for continuously feeding such plastic film strips and such articles to and along said pathway at a predetermined speed with film strip from such first source being disposed above and in registry with such articles and film strip from such second source being disposed below and in registry with such articles and with the vertically registered side edges of such film strips extending respectively laterally beyond the side edges of such articles, first means for continuously heat sealing and joining the vertically registered and moving side edges of such film strips to provide a moving plastic sleeve in which such articles are disposed, and second means for heating such strips along transversely extending lines disposed in the spaces between such articles, said second means being arranged to melt the vertically registered film strips along zones adjacent such lines thereby to divide such strips into lengths with each such length containing an article, and said second means being arranged to heat-seal and join the transversely extending edges of such lengths, said second means including a lower seal roller disposed below said pathway to extend transversely thereacross and a cooperating upper seal roller disposed above said pathway to extend transversely thereacross, the axes of said rollers being parallel, transmission means for drivingly connecting said seal rollers to provide corresponding movement thereof, a constant speed rotary driver and a relatively variable speed rotary driver, clutch means for alternatively drivingly connecting said constant speed driver and said variable speed drive to said transmission means, one of said seal rollers having an axially extending heating element carried on its periphery and axially extending compression elements disposed on opposite sides of said heating element, the other of said seal rollers having a pair of axially extending compression elements disposed on its periphery and spaced apart to engage, respectively, said first mentioned compression elements during each revolution of said seal rollers, whereby, as such film strips move between said seal rollers, said compression elements tightly hold such strips together on each side of such a zone while said element melts such a zone, and means for operating said clutch means so that, during the period said compression elements are engaged, said seal rollers are driven by said constant speed driver at a speed corresponding to said predetermined speed of movement of such articles and film strips, and, during the period when said compression elements are not engaged, said seal rollers are driven by said variable speed driver at a speed corresponding to the size of such articles.

11. The apparatus of claim 10 in which said clutch means is electrically operated and in which said means for operating said clutch means includes cam operated switch means associated with one of said seal rollers.

12. The apparatus of claim 10 in which said clutch means includes a first electrically operated clutch for drivingly connecting said transmission means to said constant speed driver and a second electrically operated clutch for drivingly connecting said transmission means to said variable speed driver, and in which said means for operating said clutch means includes a cam mounted on one of said seal rollers for rotation therewith, and a switch for alternately energizing said clutches, said switch and said cam being constructed and arranged so that, when said compression elements are approaching engagement, said first electrically operated clutch is energized and, when said compression elements are leaving engagement, said second electrically operated clutch is energized.

13. The apparatus of claim 3 in which said second means includes a lower seal roller disposed below said pathway to extend transversely thereacross and a cooperating upper seal roller disposed above said pathway to extend transversely thereacross, the axes of said seal rollers being parallel, transmission means for drivingly connecting said seal rollers to provide corresponding movement thereof, a constant speed rotary driver and a relatively variable speed rotary driver, clutch means for alternately drivingly connecting said constant speed driver and said variable speed driver to said transmission means, one of said seal rollers having an axially extending heating element carried on its periphery and axially extending compression elements disposed on opposite sides of said heating element, the other of said seal rollers having a pair of axially extending compression elements disposed on its periphery and spaced apart to engage, respectively, said first-mentioned compression elements during each revolution of said seal rollers, whereby, as such film strips move between said seal rollers, said compression elements tightly hold such strips together on each side of such a zone while said element melts such a zone, and means for operating said clutch means so that, during the period said compression elements are engaged, said seal rollers are driven by said constant speed driver at a speed corresponding to said predetermined speed of movement of such articles and film strips, and, during the period when said compression elements are not engaged, said seal rollers are driven by said variable speed driver at a speed corresponding to the size of such articles, said constant speed rotary driver being drivingly connected to said driving means and said variable speed rotary driver being drivingly connected to said means for selectively varying the speed at which said pusher means is driven.

14. The apparatus of claim 10 including drive roller means disposed along said pathway downstream from said seal rollers in the direction of movement of such lengths of sleeve, said drive roller means being arranged to receive such sleeve lengths from said seal rollers and to move such lengths away from said seal rollers at a spaced greater than the speed at which the film is fed to said seal rollers, thereby to separate such lengths at such melted zones.

* * * * *

PO-1050
(5/69)

UNITED STATES PATENT OFFICE
CERTIFICATE OF CORRECTION

Patent No. 3,633,333            Dated January 11, 1972

Inventor(s) Alfred H. Schlemmer and Melvin A. Pearson

It is certified that error appears in the above-identified patent and that said Letters Patent are hereby corrected as shown below:

Column 2, line 56, after "claims" insert -- appended --.
    Column 3, line 62, "lengths" (second occurrence) should be -- length --; same column, line 66, "if" should be -- is --.
    Column 5, line 52, "directed" should be -- direction --.
    Column 7, line 65, "re", last word, should be -- are --.
    Column 8, line 15, after "form" insert -- a --.
    Column 9, line 2, "an" should be -- and --.
    Column 11, line 26, after "tion" insert -- drive roller --.
    Column 12, line 3, "is" (second occurrence) should be -- its --; same column, line 46, "said" should be -- side --; same column, line 69 (Claim 1, line 10), after "above" insert -- and --.
    Column 13, line 13 (Claim 1, line 27), "to" should be -- so --; same column, line 56 (Claim 2, line 35), "cam" should be -- cams --; same column, line 73 (Claim 4, line 3), "lest" should be -- least --.
    Column 14, line 41 (Claim 8, line 14), "he" should be -- the --; same column, line 70 (Claim 8, line 43), "pane" should be -- plane --.
    Column 15, line 67 (Claim 10, line 5), "plastic" should be elided.
    Column 16, line 18 (Claim 10, line 29), after "said" insert -- seal --; same column, line 22 (Claim 10, line 33), "tively" should be -- tely --.
    Column 18, line 10 (Claim 14, line 6), "spaced" should be -- speed --.

Signed and sealed this 1st day of August 1972.

(SEAL)
Attest:

EDWARD M. FLETCHER, JR.      ROBERT GOTTSCHALK
Attesting Officer                Commissioner of Patents